United States Patent [19]
Khoury

[11] Patent Number: 5,786,808
[45] Date of Patent: Jul. 28, 1998

[54] DIGITAL POSITIONING JOYSTICK SYSTEM AND METHOD THEREFOR

[75] Inventor: Elie G. Khoury, Gilbert, Ariz.

[73] Assignee: VLSI Technology, Inc., San Jose, Calif.

[21] Appl. No.: 837,433

[22] Filed: Apr. 17, 1997

[51] Int. Cl.[6] .................................................. G09G 5/08
[52] U.S. Cl. .................... 345/161; 345/116; 74/471 XY; 200/5 R; 463/38
[58] Field of Search .................... 345/161, 156, 345/157; 74/471; 200/5 R; 463/38

[56] References Cited

U.S. PATENT DOCUMENTS 5,610,631   3/1997   Bouton et al. ............... 345/161

Primary Examiner—Jeffrey A. Hofsass
Assistant Examiner—Julie Lieu
Attorney, Agent, or Firm—Harry M. Weiss; Jeffrey D. Moy; Harry M. Weiss & Associates, P.C.

[57] ABSTRACT

A digital positioning system for a joystick. The system uses a potentiometer having one input coupled to a constant supply voltage and a second input coupled to a joystick game port for generating a variable resistance representative of a current position of the joystick. A constant current source is coupled to the joystick game port for generating a current for converting the variable resistance representative of the current position of the joystick to a voltage level representative of the current position of the joystick. An analog-to-digital (A/D) converter circuit is coupled to the joystick game port and is used to convert the voltage level representative of the current position of the joystick to a digital representation of the current position of the joystick.

11 Claims, 1 Drawing Sheet

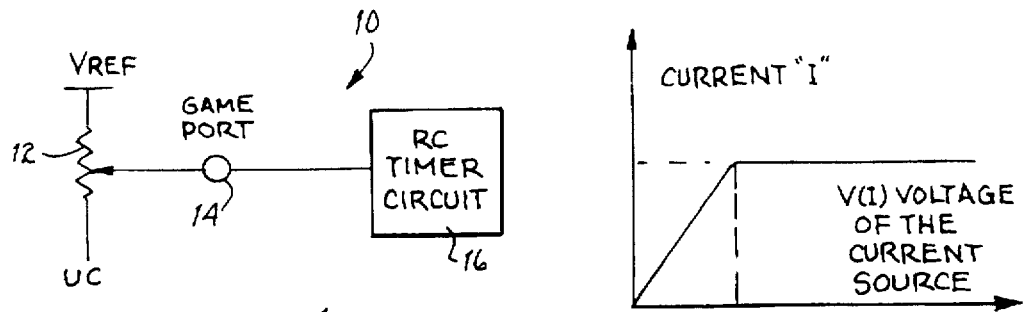
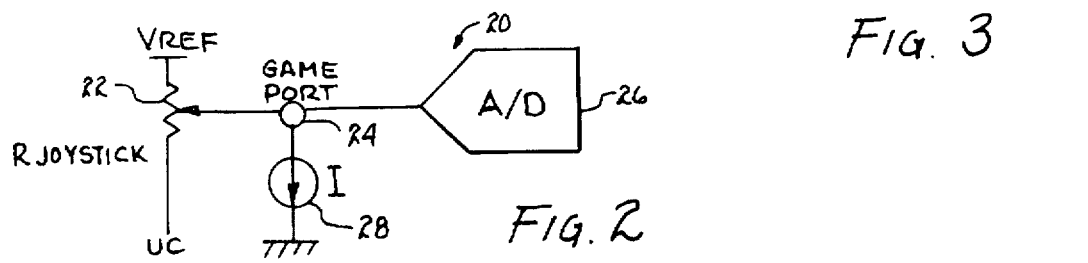
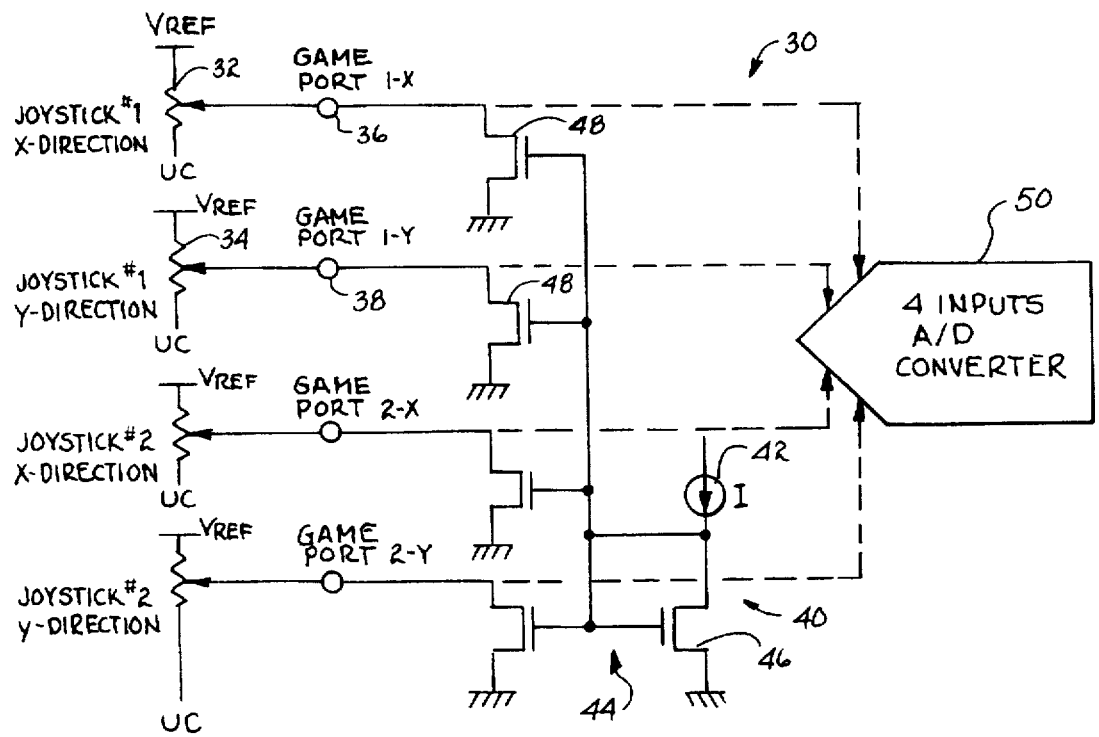

DIGITAL POSITIONING JOYSTICK SYSTEM AND METHOD THEREFOR

BACKGROUND OF THE INVENTION

1. Field of the Invention

This invention relates to peripheral components for computer systems and, more specifically, to a digital positioning joystick system for a computer system and method therefor.

2. Description of the Prior Art

Currently, most computer games are developed using programs which interface with one or more "joysticks". The joysticks are polled in order to resolve the current joystick axes position and button status. The movement of each joystick is monitored by one or more potentiometers. The joystick swings through a range on the potentiometer which is used to set a time delay of a one-shot multi-vibrator. Generally, two or more orthogonally arranged potentiometers are used per joystick to obtain related current axial settings of each joystick. Each of the axial settings sets a separate one-shot multi-vibrator to establish a different time delay which is used to determine the current axial position of the joystick.

The problem with current joysticks is that the accuracy of the potentiometer output readout may be imprecise or inconsistent due to the multi-vibrator. The readings vary particularly with changes in temperature and with inherent variations in components during manufacture. Furthermore, a relatively large component count is required for each multi-vibrator. But perhaps the biggest problem with current joystick systems is that a large amount of bus cycles are consumed by intense software loops which continuously poll the joystick system in order to determine the current axial position of the joystick. If less bus cycles are consumed, the saved bus cycles could be used for other operations within the computer system thereby increasing system performance.

Therefore, a need existed to provide an improved joystick positioning system and method therefor. The improved joystick positioning system must consistently produce an accurate indication of the current axial position of the joystick. The improved joystick positioning system must further reduce the peripheral bus overhead associated with traditional joysticks. The improved joystick positioning system will be a digital positioning joystick system. The digital joystick positioning system will replace the Resistor-Capacitor (RC) timer circuit currently being used with a more accurate Analog/Digital (A/D) converter.

SUMMARY OF THE INVENTION

In accordance with one embodiment of the present invention, it is an object of the present invention to provide an improved joystick positioning system and method therefor.

It is another object of the present invention to provide an improved joystick positioning system and method therefor that will consistently produce an accurate indication of the current axial position of the joystick.

It is still another object of the present invention to provide an improved joystick positioning system and method therefor that will reduce the peripheral bus overhead associated with traditional joysticks.

It is still a further object of the present invention to provide an improved joystick positioning system that is a digital positioning system which replaces the RC timer circuit currently being used with a more accurate A/D converter.

BRIEF DESCRIPTION OF THE PREFERRED EMBODIMENTS

In accordance with one embodiment of the present invention, a digital positioning system for a joystick is disclosed. The digital positioning system uses potentiometer means having one input coupled to a constant supply voltage and a second input coupled to a joystick game port for generating a variable resistance representative of a current position of the joystick. A constant current source is coupled to the joystick game port for converting the variable resistance representative of the current position of the joystick to a voltage level representative of the current position of the joystick. An analog-to-digital (A/D) converter circuit is coupled to the joystick game port for converting the voltage level representative of the current position of the joystick to a digital voltage signal representative of the current position of the joystick.

In accordance with another embodiment of the present invention, a method of providing a digital positioning system for a joystick is disclosed. The method comprises the steps of: providing potentiometer means having one input coupled to a constant supply voltage and a second input coupled to a joystick game port for generating a variable resistance representative of a current position of the joystick; providing a constant current source circuit coupled to the joystick game port for converting the variable resistance representative of the current position of the joystick to a voltage level representative of the current position of the joystick; and providing an analog-to-digital (A/D) converter circuit coupled to the joystick game port for converting the voltage level representative of the current position of the joystick to a digital voltage signal representative of the current position of the joystick.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a simplified functional block diagram of a prior art joystick positioning system.

FIG. 2 is a simplified functional block diagram of the digital joystick positioning system of the present invention.

FIG. 3 shows the V-I characteristics for the current source used in the digital joystick positioning system depicted in FIG. 2.

FIG. 4 is a simplified functional block diagram of a two joystick system implementing one embodiment of the digital joystick positioning system of the present invention.

DETAILED DESCRIPTION OF THE PREFERRED EMBODIMENT

Referring to FIG. 1, a standard prior art joystick positioning system 10 (hereinafter system 10) is shown. The system 10 uses a three terminal variable resistor 12 (i.e., potentiometer). One terminal of the variable resistor 12 is coupled to a reference voltage source $V_{ref}$. The central tap of the variable resistor 12 is coupled to a game port 14 of the joystick. The third terminal of the variable resistor 12 is unconnected (UC). The game port 14 is generally connected to a resistor-capacitor (RC) timer circuit 16 (i.e., one shot multivibrator).

The movement of each joystick is monitored by the variable resistor 12. The joystick swings through a range on the variable resistor 12 which is used to set a time delay of the RC timer 16. In general, two or more orthogonally arranged variable resistors 12 are used per joystick to obtain related axial settings. Each of the axial settings sets a separate RC delay circuits 16 to establish different time delays and thus the present position of the joystick.

As stated above, the problem with current joysticks is that the accuracy of the potentiometer output readout may be imprecise or inconsistent due to the multi-vibrator. The readings vary particularly with changes in temperature and with inherent variations in components during manufacture. Furthermore, a relatively large component count is required for each multi-vibrator. However, the biggest problem with current joystick systems is that a large amount of bus cycles are consumed by intense software loops which continuously poll the joystick system in order to determine the current axial position and button status of the joystick. If less bus cycles are consumed, the saved bus cycles could be used for other operations within the computer system thereby increasing system performance.

Referring to FIG. 2, the digital positioning joystick system 20 of the present invention (hereinafter system 20) is shown. Like the prior art system 10 (FIG. 1), the system 20 uses a three terminal potentiometer 22. The potentiometer 22 has one terminal coupled to a reference voltage source $V_{ref}$. The central tap of the potentiometer 22 is coupled to a game port 24 of the joystick. The third terminal of the potentiometer 22 is unconnected (UC).

The main difference between the prior art system 10 (FIG. 1) and the system 20 is that the RC timer circuit 16 (FIG. 1) of the system 10 has been replaced with an Analog-to-Digital (A/D) converter 26. However, the addition of the A/D converter 26 is not sufficient for the system 20 to generate a digital representation of the current position of the joystick. The A/D converter 26 generally samples voltage levels and not resistance. Thus, the A/D converter 26 will employ a voltage sample and hold type circuit which requires a voltage source as an input. However, since the current in the system 20 is zero (0), the A/D converter 26 will always sample $V_{ref}$.

Because of the above problem, the system 20 employs a constant current source 28 coupled between the game port 24 and ground. When the joystick changes positions, a voltage $V_{game\_port}$ will be generated at the game port 24 which is proportional to the current position of the joystick. The voltage $V_{game\_port}$ is defined as:

$$V_{game\_port} = V_{ref} - R_{joystick} \times I \qquad (1)$$

where $V_{ref}$ is the constant supply voltage coupled to the potentiometer 22, $R_{joystick}$ is a current resistance of the potentiometer 22, and I is the current supplied by the constant current source 28. The value of the constant current source 28 should be chosen so that when $R_{joystick}$ is equal to the maximum joystick resistance, the current from the constant current source will be defined as:

$$I = (V_{ref} - V_t) / R_{joystick} \qquad (2)$$

where $V_t$ is a threshold voltage level of the constant current source 28 which is defined as a voltage level between a linear and saturation region of the constant current source 28. As can be seen in FIG. 3, the voltage level V(I) of the constant current source 28 is directly proportional to the current I up to the threshold voltage $V_t$ (linear region). After the threshold voltage $V_t$, the current I enters a saturation region. Preventing the constant current source 28 from entering into the linear region ensures a linear conversion of the joystick position into a voltage representation. It is also important to have a constant current source 28 which has a very high output impedance for the same reason.

Referring now to FIG. 4, a two joystick system 30 is shown (hereinafter system 30) which implements one embodiment of the digital joystick positioning system 20 (FIG. 2) of the present invention. While the system 30 has two joysticks, the system 30 will be described with regards to the first joystick. However, it should be noted that the second joystick will be similar in design to the first joystick.

The movement of the first joystick is monitored by two or more potentiometers 32 and 34. The potentiometer 32 will monitor movement along the X-axis, while the potentiometer 34 will monitor movement along the Y-axis. Both potentiometers 32 and 34 will be a three terminal variable resistor. One terminal of each potentiometer 32 and 34 is coupled to a reference voltage source $V_{ref}$. The central tap of the potentiometers 32 is coupled to the joystick game port 1-X 36, while the central tap of the potentiometer 34 will be coupled to the joystick game port 1-Y 38. The third terminal of both potentiometers 32 and 34 are unconnected (UC).

Both joystick game ports 36 and 38 are coupled to a current generation circuit 40. The current generation circuit 40 has a constant current source 42. The constant current source 42 is used for generating a constant current (I). In the preferred embodiment of the present invention, the constant current source 42 must generate a current (I) which is less than or equal to:

$$I = (V_{ref} - V_t) / R_{joystick} \qquad (3)$$

wherein $V_{ref}$ is the supply voltage coupled to both potentiometers 32 and 34, $V_t$ is a threshold voltage level of the constant current source 42 which is defined as the boundary between a linear and a saturation region of the constant current source 42, and $R_{joystick}$ is the maximum individual resistance of the potentiometer 32 or 34. A constant current source 42 which generates a current I which is less than or equal to the value defined in equation (3) will ensure a linear conversion of the joystick position into a voltage representation. The constant current source 42 should also have a high output impedance for the same reason.

A current mirroring circuit 44 is coupled to the constant current source 42 and to each joystick game port 36 and 38. The current mirroring circuit 44 provides an equal current I to each potentiometer 32 and 34 for converting each of the individual variable resistances of each of the potentiometers 32 and 34 to individual voltage levels representative of the current axial position of the first joystick. The current mirroring circuit 44 has a first CMOS transistor 46 having drain, gate, and source terminals. The drain and gate terminals of the CMOS transistor 46 are coupled to the constant current source 42, while the source terminal of the CMOS transistor 46 is coupled to ground. The second CMOS transistors 48 mirror the current I through CMOS transistors 46. Each of the second CMOS transistors 48 also have drain, gate, and source terminals. The gate terminals of each of the second CMOS transistors 48 are coupled to the drain and gate terminals of the first CMOS transistor 46. The source terminals of each of the second CMOS transistors 48 are coupled to ground. The drain terminals of each of the second CMOS transistors 48 are individually coupled to a separate and different joystick game port.

As the joystick moves, each potentiometer 32 and 34 swings through a resistance range from zero (0) to $R_{joystick}$. When the joystick changes positions, the current I causes a voltage at each game port 36 and 38 to be generated which is proportional to the current axial position of the joystick (i.e., $V_{game\_port\ 1-X}$ is a voltage level at the joystick game port 1-X 36 which is proportional to the current X-axis position of the first joystick and $V_{game\_port\ 1-Y}$ is a voltage level at the joystick game port 1-Y 38 which is proportional to the current y-axis position of the first joystick). An analog-to-digital (A/D) converter circuit 50 takes the measured voltage levels at each joystick game port 36 and 38 and converts each individual voltage level representative of a current axial position of the first joystick to individual digital representations of the current axial position of the first joystick.

While the invention has been particularly shown and described with reference to a preferred embodiment thereof, it should be understood by those skilled in the art that changes in form and detail may be made therein without departing from the spirit and scope of the invention.

What is claimed is:

1. A digital positioning system for a joystick comprising, in combination:

a plurality of potentiometers each of said plurality of potentiometers having one input coupled to a constant supply voltage and a second input coupled to a joystick game port each of said plurality of potentiometers generating an individual variable resistance representative of a current axial position of said joystick;

a constant current generation circuit coupled to said joystick game ports for generating a current for converting each of said individual variable resistances representative of said current axial position of said joystick to individual voltage levels representative of said current axial position of said joystick; and an analog-to-digital (A/D) converter circuit coupled to said joystick game ports for converting each of said individual voltage levels representative of said current axial position of said joystick to individual digital voltage signals representative of said current axial position of said joystick;

wherein said constant current generation circuit comprises:

a constant current source for generating said current; and a current mirroring circuit coupled to said constant current source and to said joystick game ports for sending said current generated by said constant current source to each of said plurality of potentiometers for converting each of said individual variable resistances of each of said plurality of potentiometers to said individual voltage levels representative of said current axial position of said joystick.

2. A digital positioning system for a joystick in accordance with claim 1 wherein said current mirroring circuit comprises:

a first CMOS transistor having drain, gate, and source terminals wherein said drain and gate terminals are coupled to said constant current source and said source terminal is coupled to ground; and a plurality of second CMOS transistors equal in number to said plurality of potentiometers, each of said plurality of second CMOS transistors having drain, gate, and source terminals wherein each of said gate terminals of said plurality of second CMOS transistors is coupled to said drain and gate terminals of said first CMOS transistor, each of said source terminals of said plurality of second CMOS transistors is coupled to ground, and each of said drain terminals of said plurality of second CMOS transistors is individually coupled to a separate and different joystick game port.

3. A digital positioning system for a joystick in accordance with claim 1 wherein said current (I) generated by said constant current source is less than $(V_{ref}-V_t)/R_{joystick}$ wherein $V_{ref}$ is said constant supply voltage coupled to each of said plurality of potentiometers, $V_t$ is a threshold voltage level of said constant current source which is a boundary between a linear and a saturation region of said constant current source, and $R_{joystick}$ is a maximum resistance of said potentiometer.

4. A digital positioning system for a joystick in accordance with claim 1 wherein said constant current source has a high output impedance to ensure a linear conversion of said variable resistance representative of said current axial position of said joystick to said voltage level representative of said current axial position of said joystick.

5. A method of providing a digital positioning system for a joystick comprising the steps of:

providing potentiometer means having one input coupled to a constant supply voltage and a second input coupled to a joystick game port for generating a variable resistance representative of a current position of said joystick;

providing a constant current source circuit coupled to said joystick game port for generating a current for converting said variable resistance representative of said current position of said joystick to a voltage level representative of said current position of said joystick; and providing an analog-to-digital (A/D) converter circuit coupled to said joystick game port for converting said voltage level representative of said current position of said joystick to a digital voltage signal representative of said current position of said joystick;

wherein said step of providing potentiometer means further comprises the step of providing a plurality of potentiometers wherein each of said plurality of potentiometers has one input coupled to said constant supply voltage and a second input coupled to separate joystick game ports each of said plurality of potentiometers generating an individual variable resistance representative of a current axial position of said joystick; and wherein said step of providing a constant current source circuit further comprises the steps of:
   providing a constant current source for generating said current; and
   providing a current mirroring circuit coupled to said constant current source and to said joystick game ports for sending a current generated by said constant current source to each of said plurality of potentiometers for converting each of said individual variable resistance of each of said plurality of potentiometers to said individual voltage levels representative of said current axial position of said joystick.

6. The method of claim 5 wherein said step of providing said current mirroring circuit further comprises the steps of:

providing a first CMOS transistor having drain, gate, and source terminals wherein said drain and gate terminals are coupled to said constant current source and said source terminal is coupled to ground; and providing a plurality of second CMOS transistors equal in number to said plurality of potentiometers, each of said plurality of second CMOS transistors having drain, gate, and source terminals wherein each of said gate terminals of said plurality of second CMOS transistors is coupled to said drain and gate terminals of said first CMOS transistor, each of said source terminals of said plurality of second CMOS transistors is coupled to ground, and each of said drain terminals of said plurality of second CMOS transistors is individually coupled to a separate and different joystick game ports.

7. The method of claim 5 wherein said step of providing said constant current source further comprises the step of providing said constant current source which generates said current (I) which is less than $(V_{ref}-V_t)/R_{joystick}$ wherein $V_{ref}$ is said constant supply voltage coupled to each of said plurality of potentiometers, $V_t$ is a threshold voltage level of said constant current source which is a boundary between a linear and a saturation region of said constant current source, and $R_{joystick}$ is a maximum resistance of said potentiometer.

8. The method of claim 5 wherein said step of providing said constant current source further comprises the step of providing said constant current source which has a high output impedance to ensure a linear conversion of said variable resistance representative of said current axial position of said joystick to said voltage level representative of said current axial position of said joystick.

9. A digital positioning system for a joystick comprising, in combination:
 a plurality of potentiometers each of said plurality of potentiometers having one input coupled to a constant supply voltage and a second input coupled to a joystick game port each of said plurality of potentiometers generating an individual variable resistance representative of a current axial position of said joystick;
 a constant current generation circuit coupled to said joystick game ports for generating a current for converting each of said individual variable resistances representative of said current axial position of said joystick to individual voltage levels representative of said current axial position of said joystick, said constant current generation circuit comprising:
  a constant current source for generating said current; and
  a current mirroring circuit coupled to said constant current source and to said joystick game ports for sending said current generated by said constant current source to each of said plurality of potentiometers for converting each of said individual variable resistances of each of said plurality of potentiometers to said individual voltage levels representative of said current axial position of said joystick, said current mirroring circuit comprising:
   a first CMOS transistor having drain, gate, and source terminals wherein said drain and gate terminals are coupled to said constant current source and said source terminal is coupled to ground; and
   a plurality of second CMOS transistors equal in number to said plurality of potentiometers, each of said plurality of second CMOS transistors having drain, gate, and source terminals wherein each of said gate terminals of said plurality of second CMOS transistors is coupled to said drain and gate terminals of said first CMOS transistor, each of said source terminals of said plurality of second CMOS transistors is coupled to ground, and each of said drain terminals of said plurality of second CMOS transistors is individually coupled to a separate and different joystick game port; and
 an analog-to-digital (A/D) converter circuit coupled to said joystick game ports for converting each of said individual voltage levels representative of said current axial position of said joystick to individual digital voltage signals representative of said current axial position of said joystick.

10. A digital positioning system for a joystick in accordance with claim 9 wherein said current (I) generated by said constant current source is less than $(V_{ref}-V_t)/R_{joystick}$ wherein $V_{ref}$ is said constant supply voltage coupled to each of said plurality of potentiometers, $V_t$ is a threshold voltage level of said constant current source which is a boundary between a linear and a saturation region of said constant current source, and $R_{joystick}$ is a maximum resistance of said potentiometer.

11. A digital positioning system for a joystick in accordance with claim 9 wherein said constant current source has a high output impedance to ensure a linear conversion of said variable resistance representative of said current axial position of said joystick to said voltage level representative of said current axial position of said joystick.

* * * * *